(12) United States Patent
Rundall et al.

(10) Patent No.: US 10,002,069 B2
(45) Date of Patent: Jun. 19, 2018

(54) AUTOMATED TESTING OF APPLICATION PROGRAM INTERFACE

(71) Applicant: INTERNATIONAL BUSINESS MACHINES CORPORATION, Armonk, NY (US)

(72) Inventors: Andrew M. Rundall, Clinton Corners, NY (US); Anthony T. Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 15/274,020

(22) Filed: Sep. 23, 2016

(65) Prior Publication Data

US 2018/0089072 A1   Mar. 29, 2018

(51) Int. Cl.
*G06F 9/44* (2018.01)
*G06F 11/36* (2006.01)
*G06F 17/27* (2006.01)

(52) U.S. Cl.
CPC ...... *G06F 11/3688* (2013.01); *G06F 11/3692* (2013.01); *G06F 17/271* (2013.01)

(58) Field of Classification Search
CPC .......................... G06F 11/3688; G06F 11/3692
USPC .................................................. 717/124, 126
See application file for complete search history.

(56) References Cited

U.S. PATENT DOCUMENTS

| | | | | |
|---|---|---|---|---|
| 5,495,571 A * | 2/1996 | Corrie, Jr. | ........... | G06F 11/3684 714/38.1 |
| 5,701,408 A * | 12/1997 | Cornell | ............... | G06F 11/3692 714/38.1 |
| 5,754,860 A * | 5/1998 | McKeeman | ........ | G06F 11/3684 714/E11.208 |
| 6,591,417 B1 * | 7/2003 | Strysniewicz | ............ | G06F 8/65 717/168 |
| 8,010,950 B1 * | 8/2011 | Silaev | ................. | G06F 11/3672 717/131 |
| 8,862,950 B1 * | 10/2014 | Ginsberg | ............ | G06F 11/3688 714/25 |

(Continued)

OTHER PUBLICATIONS

Bracha, "Generics in the Java Programming Language", Jul. 5, 2004.*

(Continued)

*Primary Examiner* — Phillip H Nguyen
(74) *Attorney, Agent, or Firm* — Cantor Colburn LLP; William A. Kinnaman, Jr.

(57) ABSTRACT

A computer-implemented test method which includes obtaining, using a processor system, key words relating to a first application program interface developed utilizing a first programming language and constructing, using a processor system, a testing protocol utilizing the keywords. The testing protocol is applied to the first application program interface to create a first application program interface testing result. The testing protocol is also applied to a second application program interface developed utilizing a second programming language to create a second application program interface testing result. The first application program interface testing results are compared with the second application program interface testing results to determine if the second application program interface provided an accurate output.

20 Claims, 4 Drawing Sheets

(56) References Cited

U.S. PATENT DOCUMENTS

| | | | |
|---|---|---|---|
| 9,600,402 B2* | 3/2017 | Kruglick | G06F 11/3672 |
| 9,846,639 B2* | 12/2017 | Raghavan | G06F 11/3692 |
| 2006/0190771 A1* | 8/2006 | Hefner | G06F 11/3684 |
| | | | 714/38.14 |
| 2010/0100872 A1 | 4/2010 | Mitra | |
| 2014/0068639 A1* | 3/2014 | Schrock | G06F 9/54 |
| | | | 719/328 |
| 2014/0337821 A1 | 11/2014 | Pilot et al. | |
| 2014/0359586 A1 | 12/2014 | Payette et al. | |
| 2015/0186193 A1* | 7/2015 | Jain | G06F 9/541 |
| | | | 719/328 |
| 2015/0227452 A1 | 8/2015 | Raghavan et al. | |
| 2015/0242529 A1 | 8/2015 | Kinger | |
| 2016/0283364 A1* | 9/2016 | Raghavan | G06F 11/3692 |
| 2017/0337052 A1* | 11/2017 | Elkabany | G06F 8/71 |

OTHER PUBLICATIONS

Disclosed Anonymously, "Associating metadata with cross correlating code snippets", ip.com, IPCOM000197783D, Jul. 22, 2010.
Ibm et al., "Automated parsing of commands entered into a command line interface", ip.com, IPCOM000184991D, Jul. 7, 2009.

\* cited by examiner

| Parsed Keyword: | Parameter Syntax Length(characters): | Parameter Type: | Exceptions: |
|---|---|---|---|
| ADDUSER(xxxxxxxx) | Min. 1 – Max. 8 | Character String | _ , blanks, %, #, @ |
| ADDGROUP(xxxxxxxx) | Min. 1 – Max. 8 | Character String | _ , blanks, %, #, @ |
| DELUSER(xxxxxxxx) | Min. 1 – Max. 8 | Character String | _ , blanks, %, #, @ |
| DELGROUP(xxxxxxxx) | Min. 1 – Max. 8 | Character String | _ , blanks, %, #, @ |
| PASSWORD(xxxxxxxxxx) | Min. 1 – Max. 10 | Character String | _ , blanks, %, #, @ |
| PASSWORD HISTORY(x) | Min. 1 – Max. 1 | Boolean(Y/N) | N/A |

AUTOMATED TESTING OF APPLICATION PROGRAM INTERFACE

BACKGROUND

Computer programs typically utilize interfaces or call modules for accessing external modules for undertaking routine tasks. Such interfaces are customarily modified with system upgrades which utilize more modernized programming languages. Incorporating new interfaces requires system testing to ensure that the systems operate as intended and functionality would not be jeopardized when the new upgraded interfaces are incorporated into the operational system code. Testing, however, should be conducted in an efficient and effective manner off-line. Accordingly, there is a need to provide for a testing system which efficiently and effectively tests the new interfaces.

SUMMARY

One embodiment includes a computer-implemented test method which includes obtaining, using a processor system, keywords relating to a first application program interface developed utilizing a first programming language and constructing, using a processor system, a testing protocol utilizing the keywords. The testing protocol is applied to the first application program interface to create a first application program interface testing result. The testing protocol is also applied to a second application program interface developed utilizing a second programming language to create a second application program interface testing result. The first application program interface testing results are compared with the second application program interface testing results to determine if the second application program interface provided an accurate output.

One or more embodiments include a system for testing which includes a first application program interface developed utilizing a first programming language, the first application program interface having keywords and a second application program interface developed utilizing a second programming language. A processor parses the keywords associated with the first application program interface and develops a test protocol for testing the operation of the first application program interface and second application program interface. A test input generator generates test input based upon the parsed keywords. The processor calls the first application program interface and second application program interface and provides the test input to the first application program interface and second application program interface. The processor compares the results generated by the first application program interface when provided the test input and the results generated by the second application program interface when provided the test input to verify if the second application program interface produces an accurate output.

One or more embodiments of the present disclosure present a computer program product for testing, the computer program product comprising a computer readable storage medium having program instructions embodied therewith, wherein the computer readable storage medium is not a transitory signal per se, the program instructions readable by a processing circuit to cause the processing circuit to perform a method which includes obtaining, using a processor system, keywords relating to a first application program interface developed utilizing a first programming language and constructing, using the processor system, a testing protocol utilizing the keywords. The testing protocol is applied to the first application program interface to create a first application program interface testing result. The testing protocol is also applied to a second application program interface developed utilizing a second programming language to create a second application program interface testing result. The first application program interface testing results are compared with the second application program interface testing results to determine if the second application program interface provided an accurate output.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for automatically testing an application program interface. The testing is conducted utilizing a legacy application program interface which is trusted and produces accurate results. Keywords associated with the application program interface are acquired and utilized for generating a test protocol which is associated with a test input generator for producing a testing environment. The legacy application program interface and new application program interface are both subjected to testing in the testing environment. The trusted results of the legacy application program interface are compared with the results of the new application program interface to verify if the new application program interface produced an accurate output.

Figure 1:
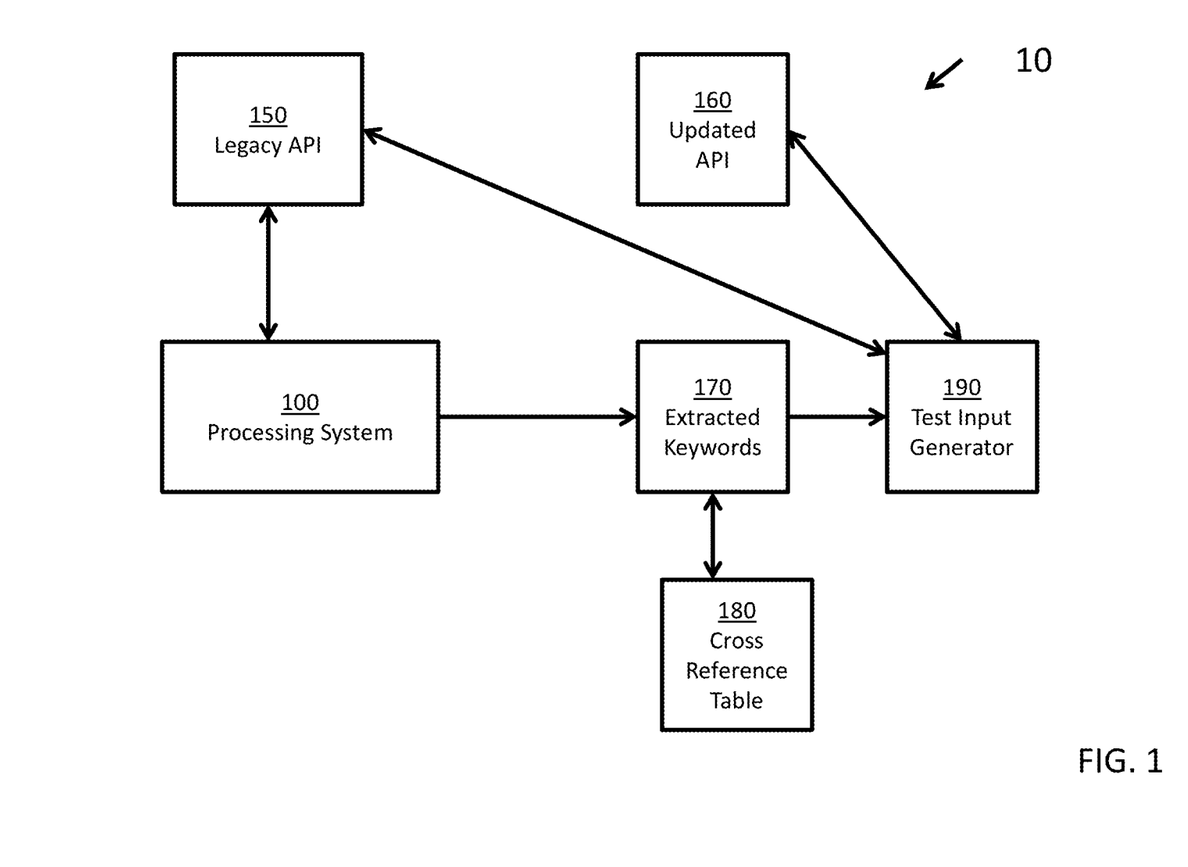
FIG. 1 shows a computer system according to one or more embodiments.

Turning now to a more detailed description of the present disclosure, there is shown in FIG. 1 a system 10 for automatically testing an application program interface. The system 10 includes a first application program interface 150. The first application program interface 150 may be hosted on a computer system 100 or accessible by computer system 100 for execution. An application program interface is typically a set of subroutines or protocols utilized in building programs and applications. The application program interface generally is defined to provide a standard and frequent request. Developers can make requests by including calls to the application program interface in their applications. The syntax necessary to engage in the call is generally described in the documentation of the application being called.

As shown in FIG. 1, a second application program interface 160 may also be hosted on computer system 100 or accessible by computer system 100 for execution. In the embodiment, second application interface 160 is an updated application program interface which is functionally equivalent to the first application interface 150 but written in a different language and untested for compatibility with the overall operational environment which utilizes application program interface 150. For example, a first application program interface 150 may be designed to provide a date in a Julian calendar format and is written in a programming language such as COBOL, Fortran, Pasqual, C, C++, while a second application interface 160 is functionally equivalent to the first application program interface 150 but may provide a date based on a Gregorian calendar. Furthermore, the second application interface 160 may be written in a separate programming language such as JAVA®. Installing new application program interfaces requires testing to ensure operational compliance. The invention provides for an automated testing procedure which may be undertaken by computer system 100.

Figure 2:
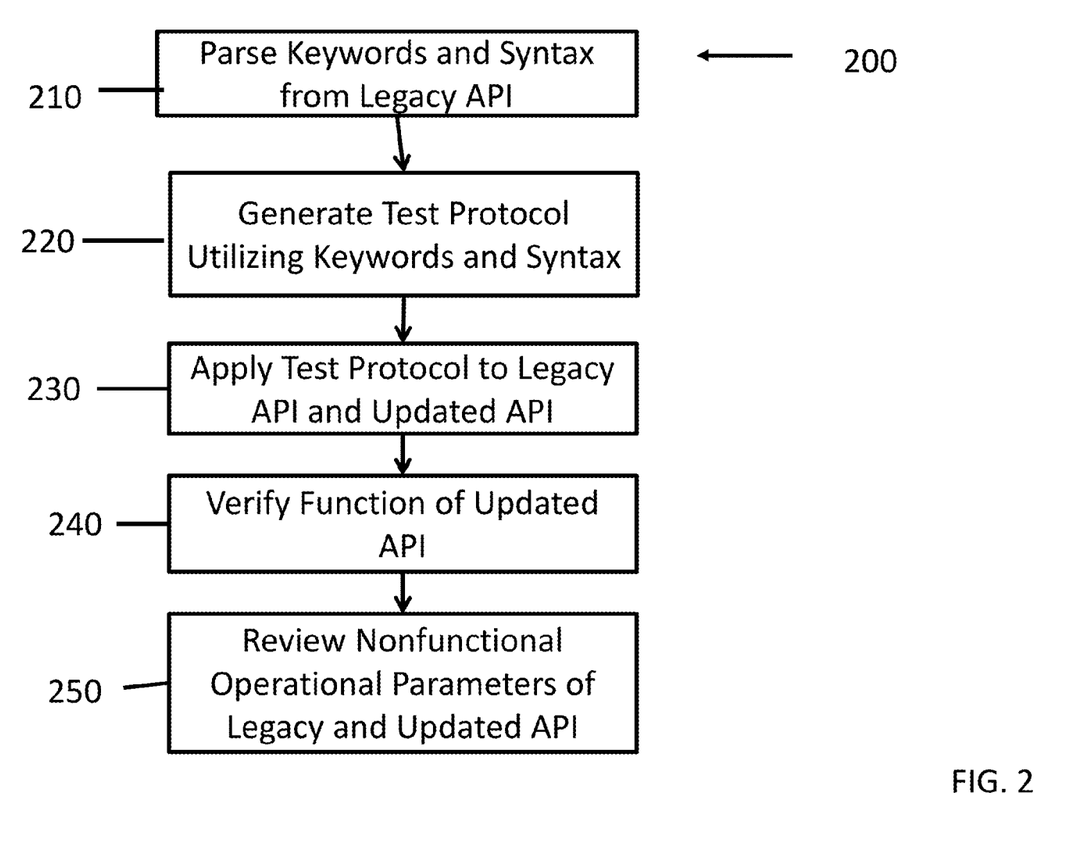
FIG. 2 shows the flow process of an automated testing process for an application program interface according to the teachings herein.

As shown in FIGS. 1 and 2, the automated testing procedure 200 includes the first application program interface 150 which is the legacy application program interface functioning in the operational computing environment of a computer network. At block 210, keywords associated with the first application program interface 150 are parsed. The keywords may be obtained from the source code or object code of the legacy application program interface. The keywords may also be obtained from documentation relating to the legacy application program interface. At block 210, with the parsing of the keywords, the syntax related to the keywords is preferably obtained. The keywords are stored in the extracted keyword database 170. At block 220, the testing protocol is developed utilizing the keywords and syntax parsed from the first application program interface 150. As the first application program interface 150 is the legacy application program interface, the functional operation of the first application program interface is trustworthy. Accordingly, utilizing the known keywords and syntax associated with the first application program interface provides a trusted test protocol which may be utilized in testing the functional operation of the second application program interface 160. In the event that the second application program interface does not contain semantically equivalent keywords, a cross reference table 180 may be provided. For example first application program interface may utilize the following keywords and associated syntax: USER (xxxxxxxx); GROUP(xxxxxxxx) and PWORD(xxxxxxxx) which would be mapped with the corresponding second application program interface variables UserName (xxxxxxxx); GroupName(xxxxxxxx) and Password (xxxxxxxx) in the cross-reference table. The cross-reference table would include additional mapping of known parameter and syntax associations.

After the keywords and syntax are acquired at step 210, the keywords and syntax are passed to a test input generator 190. Test input generator 190 generates a test protocol at step 220 utilizing the keywords and syntax. Test generator 190 generates input for testing the functionality of first application program interface 150 and second application program interface 160. The input generated may be different based on the syntax associated with the respective application program interface. The cross-reference table 180 may be utilized in creating the test protocol by mapping the respective keywords associated with the first application program interface with the second application program interface.

At step 230 the test protocol generated by test generator 190 is processed by both the first legacy application program interface 150 and second legacy application program interface 160. In operation, a call to the first and second application program interfaces are made with the input generated by the test generator. The respective application program interfaces process the input data and produce a result. The result from the first application program interface processing the test protocol input is compared with the result from the second application program interface processing the test protocol input and verified at step 240. The verification step identifies if the second application program interface is functionally equivalent to the first application program interface.

Also, at step 250, nonfunctional operational parameters relating to the performance of the first application program interface and second application program interface may be evaluated. For instance, the CPU consumption may be monitored to evaluate if the second application program interface utilizes the same computer resources as the first application program interface to process the test input data. Additionally, the elapsed runtime of the processing of the respective application program interface may be monitored to evaluate the performance of the programs with respect to each other. In this manner, in addition to the functional equivalence of the firsts and second application program interfaces being evaluated, the nonfunctional operational parameters may also be evaluated to determine which program interface operates more efficiently.

Figure 3:
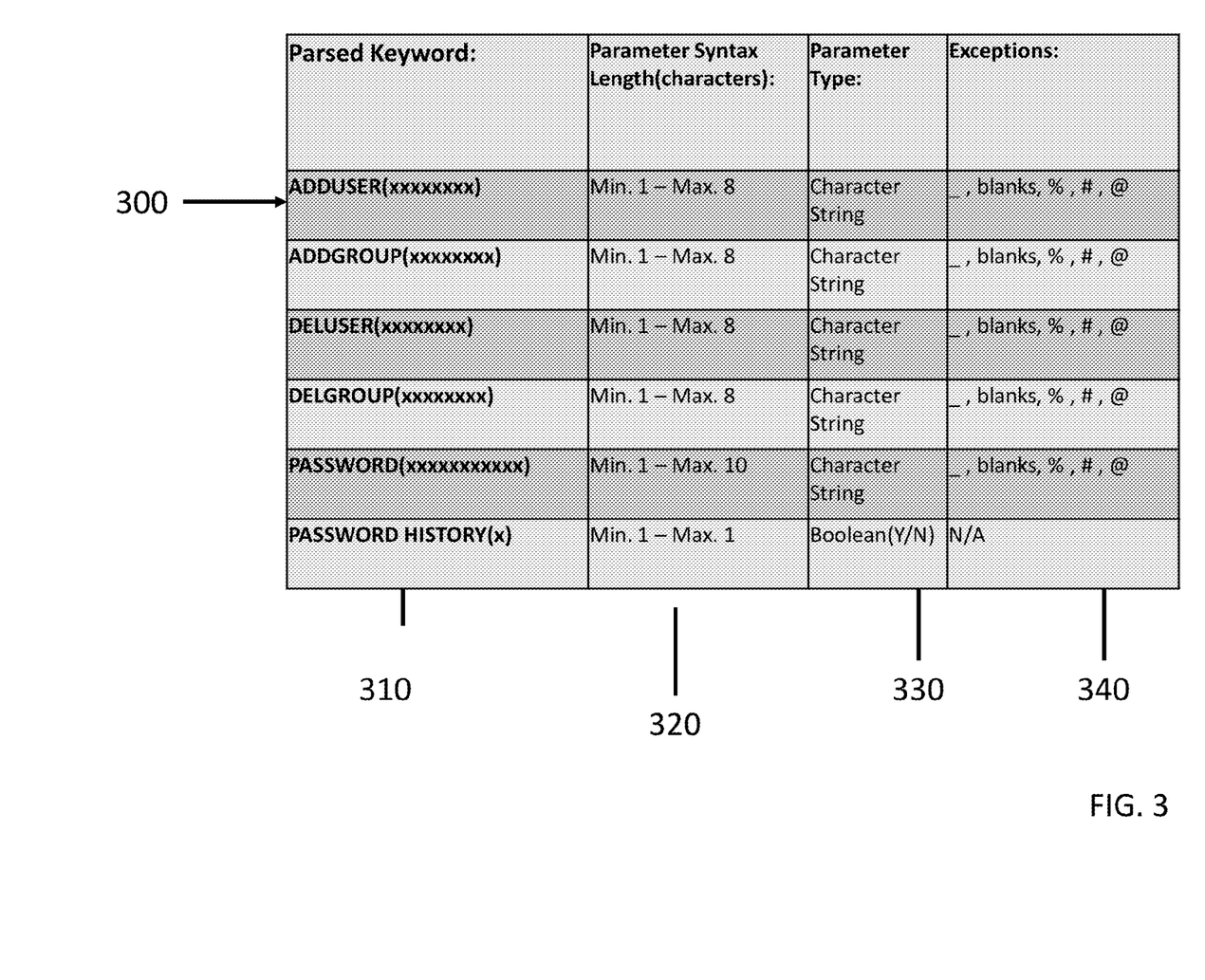
FIG. 3 shows a testing protocol for an application program interface according to the teachings herein.

In operation, the invention provides for an automatic testing of a new application program interface in the software development environment prior to incorporating the new application program interface into the live operational environment of the system. The automatic testing utilizes the known performance of a legacy application program interface which preferably currently operates in the live operational environment of the system. In essence, the legacy application program interface is fully debugged, operational and trusted. When an upgraded application program interface is provided, generally utilizing a different programming language than the programming language utilized for creating the first application program interface, testing of the new second application program is required. Testing of the new second application program is done automatically. Initially, a first application program interface corresponds with the functionality of the second application program is selected. Once the first application program is identified, the system parses the keywords associated with the first application program. The keywords may be obtained from the source or object code or documentation which supports the first application program and contains the keywords within the documentation. Preferably the syntax associated with the keywords is also parsed. FIG. 3 illustrates an example of keywords and respective syntax which is parsed from a respective first application program for developing a test protocol. The test protocol 300 may include parsed keywords 310, parameter syntax 320, parameter type 330, and exceptions 340. Test data is generated for operating with the test protocol for testing the first and second application program interfaces. A look-up table may be provided to assist in generating a test protocol which is compatible with the language associated with the second application program. The corresponding test protocol which is compatible with the respective first and second application program interface is applied simultaneously or concurrently to the application program interface for producing a result. As the first application interface program is known and trusted, the result produced is the accurate result based on the test input. The result of the first application interface program is compared with the result of the second application interface program. If the second application interface program produces a result identical to the first application interface program, then it is determined that the second application interface program is functionally equivalent to the first application interface program and is also functioning correctly producing an accurate result.

As an example, the first application interface program may be written in a programming language such as COBOL. The first application interface program may be utilized to provide a date function. Namely, when a date is required during the operation of a respective system operation, the first application interface program will be called to produce a date feature. In this example, the date provided by the first application interface program may be in a Julian calendar format. The second application program interface may be utilized as a replacement for the first application interface program and requires testing. The second application program interface may be written in a different program language such as JAVA®. The invention requires that the first and second application interface program provide the same functionality. In this example, the second application interface program will be called to produce a date feature. The date feature may be in the same Julian calendar format as the first application interface program or in a different format such as Gregorian. The test protocol would utilize keywords derived from the first application program interface and provide input test data such that the first and second application interface programs provide a date. If in the example, the first application program interface provides a date of 2013-348, which corresponds with Dec. 14, 2013, and the second application program interface provides a date of 2013-01-01, which corresponds with Jan. 1, 2013, then the comparison of the results illustrate that the second application program has a bug and produced an incorrect result. However, if the second application program interface provided a date of 2013-12-14, then the result produced by the second application program interface is verified when compared to the result produced by the first application program interface and the second application program interface is functionally equivalent as compared to the first application program interface and provided an accurate result.

In this illustrative example, the advantage of the embodiment as shown enables an automatic testing environment to be provided for testing the functional equivalence of a second application program interface with a pre-existing legacy first application program interface. The processing system 100 may automatically parse keywords and associated syntax from the first application program interface and construct a test protocol based on the keywords and syntax. The test protocol includes generated input data and is applied to both the original first application program interface and the new second application program interface. Using the known, trusted first application program interface as the basis for creating the test protocol for the second application program interface enables the system to automatically create the test protocol and generate the respective input data. The processing system 100 may call both the first and second application program interfaces automatically and apply the test protocol and input test data automatically. The processing system 100 may monitor the nonfunctional operational parameters for determining the system resources associated with the respective first and second application program interfaces. Furthermore, the processing system 100 may automatically compare and validate the results of the second application programing interface with the results generated by the trusted first application programming interface. In the event that the second application program interface operates functionally equivalent as compared to the first application program interface, the second application program interface will have passed the test. With the passing of the functional test, the nonfunctional operational parameters may be evaluated to determine if the second application program interface is a performance upgrade over the first application program interface.

Figure 4:
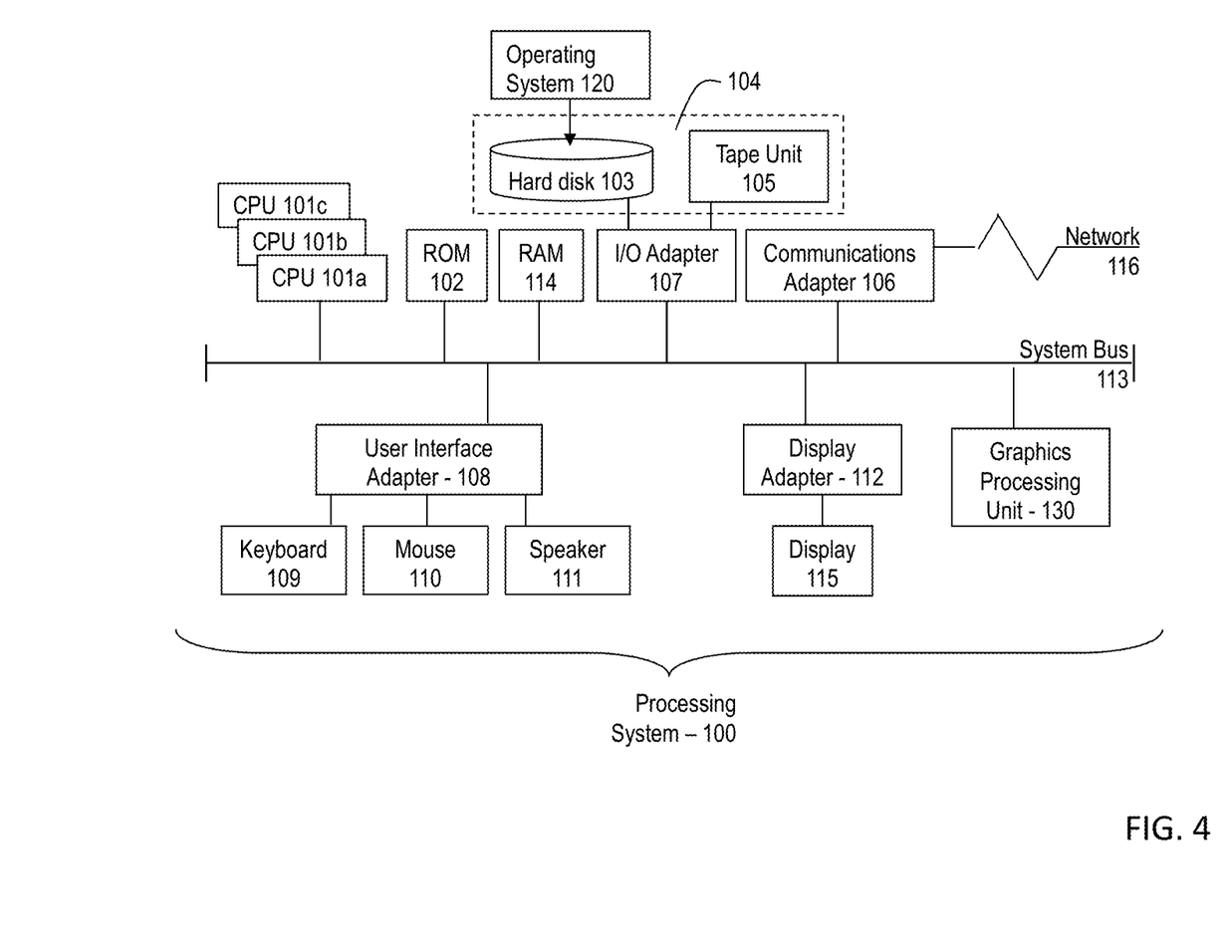
FIG. 4 shows a computer system according to an embodiment.

Referring to FIG. 4, there is shown central processing system 100 according to one or more embodiments. The system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 4 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 4, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented test method, the method comprising:
    obtaining, using a processor system, keywords relating to a first application program interface developed utilizing a first programming language;
    constructing, using the processor system, a testing protocol utilizing the keywords;
    applying, using the processor system, the testing protocol to the first application program interface to create a first application program interface testing result;
    applying, using the processor system, the testing protocol to a second application program interface developed utilizing a second programming language to create a second application program interface testing result; and
    comparing the first application program interface testing result with the second application program interface testing result to determine whether the second application program interface provides an accurate result.

2. The method of claim 1, further including obtaining, using the processor system, source code of the first application program interface and parsing the source code to provide keywords utilized for developing the testing protocol.

3. The method of claim 1, further including obtaining, using the processor system, product documentation relating to the first application program interface and parsing the product documentation to provide keywords utilized for developing the testing protocol.

4. The method of claim 1, further including parsing keyword syntax values associated with the keywords for developing the testing protocol.

5. The method of claim 4, further including providing a cross-reference table for mapping keywords associated with the first application program interface to corresponding keywords associated with the second application program interface for creating a testing protocol for the second application program interface.

6. The method of claim 1, further including translating the keywords into a format recognizable by the second application program interface for developing the testing protocol.

7. The method of claim 1, further including measuring nonfunctional operational parameters related to the first application program interface when performing a test as defined by the testing protocol and measuring nonfunctional operational parameters related to the second application program interface when performing a test as defined by the testing protocol and comparing diagnostic performance attributes.

8. The method of claim 7, wherein the nonfunctional operational parameters include one of CPU consumption and elapsed run time.

9. A system for testing, the system comprising:
a first application program interface developed utilizing a first programming language, the first application program interface having keywords;
a processor for parsing the keywords associated with the first application program interface and for developing a test protocol for testing the operation of the first application program interface and a second application program interface;
a test input generator generating test input based upon the parsed keywords;
the processor calling the first application program interface and the second application program interface and providing the test input to the first application program interface and the second application program interface; and
the processor comparing results generated by the first application program interface when provided the test input and results generated by the second application program interface when provided the test input to verify if the second application program interface produces an accurate output.

10. The system of claim 9, wherein the processor is further configured to measure nonfunctional operational parameters of the first application program interface and second application program interface for evaluating a performance of the second application program interface in comparison with the first application program interface.

11. The system of claim 9, further comprising a cross-reference table for mapping keywords associated with the first application program interface to corresponding keywords associated with the second application program interface for creating a testing protocol for the second application program interface.

12. The system of claim 9, wherein the processor is further configured to parse keyword syntax values associated with the keywords for developing the testing protocol.

13. A computer program product for testing, the computer program product comprising a computer readable storage medium having program instructions embodied therewith, wherein the computer readable storage medium is not a transitory signal per se, the program instructions readable by a processing circuit to cause the processing circuit to perform a method comprising:
obtaining, using a processor system, keywords relating to a first application program interface developed utilizing a first programming language;
constructing, using the processor system, a testing protocol utilizing the keywords;
applying, using the processor system, the testing protocol to the first application program interface to create a first application program interface testing result;
applying, using the processor system, the testing protocol to a second application program interface developed utilizing a second programming language to create a second application program interface testing result; and
comparing the first application program interface testing result with the second application program interface testing result to determine whether the second application program interface provides an accurate result.

14. The computer program product of claim 13, wherein the method further comprises obtaining, using the processor system, source code of the first application program interface and parsing the source code to provide keywords utilized for developing the testing protocol.

15. The computer program product of claim 13, wherein the method further comprises obtaining, using the processor system, product documentation relating to the first application program interface and parsing the product documentation to provide keywords utilized for developing the testing protocol.

16. The computer program product of claim 13, wherein the method further comprises parsing keyword syntax values associated with the keywords for developing the testing protocol.

17. The computer program product of claim 16, wherein the method further comprises providing a cross-reference table for mapping keywords associated with the first application program interface to corresponding keywords associated with the second application program interface for creating a testing protocol for the second application program interface.

18. The computer program product of claim 13, wherein the method further comprises including translating the keywords into a format recognizable by the second application program interface for developing the testing protocol.

19. The computer program product of claim 13, wherein the method further comprises including measuring nonfunctional operational parameters related to the first application program interface when performing a test as defined by the testing protocol and measuring nonfunctional operational parameters related to the second application program interface when performing a test as defined by the testing protocol and comparing nonfunctional performance attributes.

20. The computer program product of claim 19, wherein the nonfunctional operational parameters include one of CPU consumption and elapsed run time.

* * * * *